R. DACHEUX.
DEVICE FOR JUSTIFYING LINES OF TYPE.
APPLICATION FILED NOV. 10, 1908.
931,915.
Patented Aug. 24, 1909.
FIG_1_
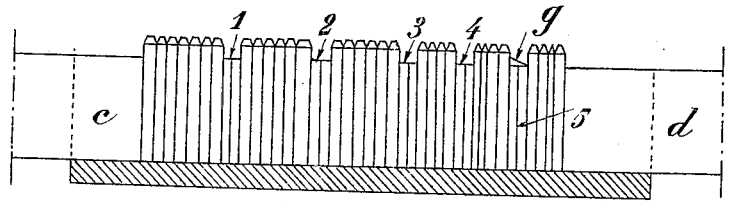
FIG_2_
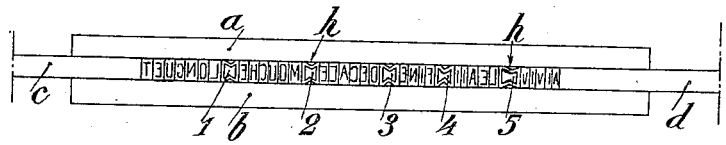
FIG_3_
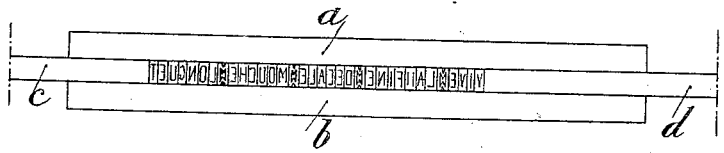
FIG_4_              FIG_6_
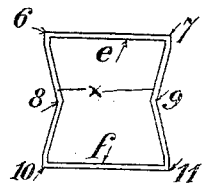    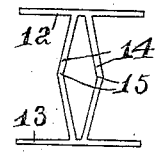
FIG_5_
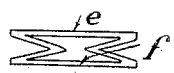
WITNESSES
W. P. Burk
A. F. Houman
INVENTOR
René Dacheux
ATT'Y

UNITED STATES PATENT OFFICE.

RENÉ DACHEUX, OF LIEGE, BELGIUM.

DEVICE FOR JUSTIFYING LINES OF TYPE.

931,915.  Specification of Letters Patent.  Patented Aug. 24, 1909.

Application filed November 10, 1908. Serial No. 461,933.

*To all whom it may concern:*

Be it known that I, RENÉ DACHEUX, citizen of France, residing at 64 Boulevard Laveleye, Liege, in the Kingdom of Belgium, have invented new and useful Improvements in Devices for Justifying Lines of Type, of which the following is a specification.

This invention has for its object the use of special spacers hereinafter described, for justifying by hand or mechanically lines of printing type composed by hand or mechanically.

In the annexed drawing, Figure 1 shows in elevation a line of ordinary type. Fig. 2 shows this line in plan before justification. Fig. 3 shows the same line in plan, after justification. Fig. 4 is an enlarged section of the spacer before justification. Fig. 5 shows the same section after justification. Fig. 6 shows the section of a modified form of tube whose deformations are theoretically equivalent.

Referring to Figs. 1 to 3 of the annexed drawing, it is assumed by way of example that the line of type has been set up in a groove or channel between the lateral walls $a$ and $b$, the words being separated by the spacers 1, 2, 3, 4, 5, and that the line is limited by two abutments $c$ and $d$ one of which will be fixed. The justification in these conditions is effected by compression produced by hand or mechanically by the piece $c$ or $d$ or by the two pieces successively or simultaneously, the movement being limited according to the length of the line which it is desired to produce. With this process lines are first composed of too great a length and the justification afterward brings the same to the length desired.

The spacers used are pieces of tube or lead, tin or any other suitable metal or alloy. Each spacer consists of faces $e$, $f$, which are connected together by bent portions $x$. The deformation of these tubes by compression, takes place along the creases 6, 7, 8, 9, 10, 11, previously formed. The parallel faces $e$ and $f$ of these tubes remain parallel after deformation as these faces are pressed by types with parallel faces. The said creases may be replaced by curves or other suitable deformations which assist in effecting true collapse of the spacers. Lateral deviation is prevented by the walls $a$ and $b$ of the channel which incloses the line.

The tube when entirely flattened represents the narrowest space permitted between the words, and the tube, not deformed, represents the broadest space admitted in printing. The spacers may be provided with a tongue such as $g$, Fig. 1, adapted to prevent a thin or fine letter of an adjacent line from falling into the cavity $h$, Fig. 2, of the unflattened spacer, when the type lines are in contact one with each other, that is to say, when they are not separated by spacing lines.

Fig. 6 illustrates a theoretical form of spacer in which the deformations could also be produced regularly, but this form would be too fragile in practice and it is therefore not claimed as a part of the invention. In this figure 12 and 13 represent the two parallel faces of the spacer which are connected together by the bent portions 14 which are creased at 15, thus when pressure is applied to the faces 12 and 13 the portions 14 bend outwardly.

Having now described my invention, what I claim as new and desire to secure by Letters Patent is:

A collapsible spacer comprising a tube, the cross section of which is a substantially rectangular figure having two parallel faces and two side portions connecting said faces together, said side portions each having a weakened portion extending through the whole length of the tube intermediate its two parallel faces.

In testimony whereof I have signed my name to this specification in the presence of two subscribing witnesses.

RENÉ DACHEUX.

Witnesses:
 M. PZERMITTE,
 EMIL SCHMITT.